US012223907B2

(12) United States Patent
Huang et al.

(10) Patent No.: US 12,223,907 B2
(45) Date of Patent: Feb. 11, 2025

(54) PIXEL CIRCUIT INCLUDING A COMPENSATION CONTROL CIRCUIT, PIXEL DRIVING METHOD AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yao Huang, Beijing (CN); Ming Hu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/021,472

(22) PCT Filed: Apr. 21, 2022

(86) PCT No.: PCT/CN2022/088124
§ 371 (c)(1),
(2) Date: Feb. 15, 2023

(87) PCT Pub. No.: WO2023/201616
PCT Pub. Date: Oct. 26, 2023

(65) Prior Publication Data
US 2024/0265871 A1 Aug. 8, 2024

(51) Int. Cl.
*G09G 3/3258* (2016.01)

(52) U.S. Cl.
CPC ... *G09G 3/3258* (2013.01); *G09G 2300/0842* (2013.01); *G09G 2320/0247* (2013.01)

(58) Field of Classification Search
None
See application file for complete search history.

(56) References Cited

U.S. PATENT DOCUMENTS

2016/0063922 A1* 3/2016 Tsai .................... G09G 3/3291 345/76
2018/0350286 A1* 12/2018 Lee .................... G09G 3/3225
(Continued)

FOREIGN PATENT DOCUMENTS

CN 109559686 A * 4/2019 .......... G09G 3/3208
CN 112530341 A 3/2021
(Continued)

*Primary Examiner* — Kirk W Hermann
(74) *Attorney, Agent, or Firm* — WHDA, LLP

(57) ABSTRACT

A pixel circuit includes a light-emitting element, a driving circuit, a first light-emission control circuit, a first initialization circuit, an energy storage circuit, a compensation control circuit and a data written-in circuit. A first terminal of the energy storage circuit is electrically connected to a control terminal of the driving circuit, and a second terminal of the energy storage circuit is electrically connected to a first electrode of the light-emitting element. The data written-in circuit writes a data voltage into a first terminal of the driving circuit under control of a written-in control signal. The compensation control circuit controls the control terminal of the driving circuit to be electrically connected to a second terminal of the driving circuit under control of a compensation control signal.

13 Claims, 11 Drawing Sheets

(56) References Cited

U.S. PATENT DOCUMENTS

| | | | | |
|---|---|---|---|---|
| 2019/0096327 | A1* | 3/2019 | Peng | G09G 3/3241 |
| 2021/0327344 | A1 | 10/2021 | Dong | |
| 2022/0122522 | A1* | 4/2022 | Li | G09G 3/32 |
| 2022/0130311 | A1* | 4/2022 | Zhao | G09G 3/20 |

FOREIGN PATENT DOCUMENTS

| | | | | | |
|---|---|---|---|---|---|
| CN | 112992070 | A | * | 6/2021 | G09G 3/3225 |
| CN | 113270067 | A | | 8/2021 | |
| CN | 109887464 | B | | 9/2021 | |
| CN | 113707090 | A | * | 11/2021 | |
| CN | 113744683 | A | | 12/2021 | |

* cited by examiner

PIXEL CIRCUIT INCLUDING A COMPENSATION CONTROL CIRCUIT, PIXEL DRIVING METHOD AND DISPLAY DEVICE

CROSS-REFERENCE TO RELATED APPLICATION

This application is the U.S. national phase of PCT Application No. PCT/CN2022/088124 filed on Apr. 21, 2022, which is incorporated by reference herein in its entirety.

TECHNICAL FIELD

The present disclosure relates to the field of display technology, in particular to a pixel circuit, a pixel driving method and a display device.

BACKGROUND

Along with the continuous development of display technologies, active matrix organic light-emitting diode (AMOLED) display devices have been widely used due to such advantages as full screen, narrow bezel, high resolution, flexibility, wearability and foldability. In the related art, a brand new pixel circuit, which is able to be applied to low-frequency driving and perform a threshold voltage compensation, cannot be provided.

SUMMARY

In a first aspect, the present disclosure provides in some embodiments a pixel circuit, including a light-emitting element, a driving circuit, a first light-emission control circuit, a first initialization circuit, an energy storage circuit, a compensation control circuit and a data written-in circuit. The first light-emission control circuit is electrically connected to a light-emission control line, a first terminal of the driving circuit and the light-emitting element, and configured to control the first terminal of the driving circuit to be electrically connected to the light-emitting element under control of a light-emission control signal from the light-emission control line. The first initialization circuit is electrically connected to a reset control line, a first initial voltage terminal and a control terminal of the driving circuit, and configured to write a first initial voltage from the first initial voltage terminal into the control terminal of the driving circuit under control of a reset control signal from the reset control line. A first terminal of the energy storage circuit is electrically connected to the control terminal of the driving circuit, a second terminal of the energy storage circuit is electrically connected to a first electrode of the light-emitting element, and the energy storage circuit is configured to store electric energy. The data written-in circuit is electrically connected to a written-in control line, a data line and the first terminal of the driving circuit, and configured to write a data voltage from the data line into the first terminal of the driving circuit under control of a written-in control signal from the written-in control line. The compensation control circuit is electrically connected to a compensation control line, the control terminal of the driving circuit and a second terminal of the driving circuit, and configured to control the control terminal of the driving circuit to be electrically connected to the second terminal of the driving circuit under control of a compensation control signal from the compensation control line.

Optionally, in at least one embodiment of the present disclosure, the pixel circuit further includes a second light-emission control circuit. The second light-emission control circuit is electrically connected to the light-emission control line, a first voltage terminal and the second terminal of the driving circuit, and configured to control the first voltage terminal to be electrically connected to the second terminal of the driving circuit under control of the light-emission control signal. The first light-emission control circuit is electrically connected to the first electrode of the light-emitting element, and a second electrode of the light-emitting element is electrically connected to a second voltage terminal.

Optionally, in at least one embodiment of the present disclosure, the pixel circuit further includes a second initialization circuit. The second initialization circuit is electrically connected to an initial control line, a second initial voltage terminal and the first electrode of the light-emitting element, and configured to write a second initial voltage from the second initial voltage terminal into the first electrode of the light-emitting element under control of an initial control signal from the initial control line.

Optionally, the data written-in circuit includes a first transistor, the compensation control circuit includes a second transistor, the energy storage circuit includes a storage capacitor, and the driving circuit includes a driving transistor. A control electrode of the first transistor is electrically connected to the written-in control line, a first electrode of the first transistor is electrically connected to the data line, and a second electrode of the first transistor is electrically connected to the first terminal of the driving circuit. A control electrode of the second transistor is electrically connected to the compensation control line, a first electrode of the second transistor is electrically connected to the control terminal of the driving circuit, and a second electrode of the second transistor is electrically connected to the second terminal of the driving circuit. A first terminal of the storage capacitor is electrically connected to the control terminal of the driving circuit, and a second terminal of the storage capacitor is electrically connected to the first electrode of the light-emitting element. A control electrode of the driving transistor is the control terminal of the driving circuit, a first electrode of the driving transistor is the first terminal of the driving circuit, and a second electrode of the driving transistor is the second terminal of the driving circuit.

Optionally, the second light-emission control circuit includes a third transistor, and the first light-emission control circuit includes a fourth transistor. A control electrode of the third transistor is electrically connected to the light-emission control line, a first electrode of the third transistor is electrically connected to the first voltage terminal, and a second electrode of the third transistor is electrically connected to the second terminal of the driving circuit. A control electrode of the fourth transistor is electrically connected to the light-emission control line, a first electrode of the fourth transistor is electrically connected to the first terminal of the driving circuit, and a second electrode of the fourth transistor is electrically connected to the first electrode of the light-emitting element.

Optionally, the first initialization circuit includes a fifth transistor, a control electrode of the fifth transistor is electrically connected to the reset control line, a first electrode of the fifth transistor is electrically connected to the first initial voltage terminal, and a second electrode of the fifth transistor is electrically connected to the control terminal of the driving circuit.

Optionally, the second initialization circuit includes a sixth transistor, a control electrode of the sixth transistor is electrically connected to the initial control line, a first electrode of the sixth transistor is electrically connected to the second initial voltage terminal, and a second electrode of the sixth transistor is electrically connected to the first electrode of the light-emitting element.

Optionally, in at least one embodiment of the present disclosure, the pixel circuit further includes a third initialization circuit. The third initialization circuit is electrically connected to the reset control line and a third initial voltage terminal, the third initialization circuit is electrically connected to the first terminal of the driving circuit or the second terminal of the driving circuit, and the third initialization circuit is configured to write a third initial voltage from the third initial voltage terminal into the first terminal of the driving circuit or the second terminal of the driving circuit under control of the reset control signal from the reset control line.

Optionally, the third initialization circuit includes a seventh transistor, a control electrode of the seventh transistor is electrically connected to the reset control line, a first electrode of the seventh transistor is electrically connected to the third initial voltage terminal, and a second electrode of the seventh transistor is electrically connected to the first terminal of the driving circuit or the second terminal of the driving circuit.

Optionally, a transistor in the light-emission control circuit, a transistor in the data written-in circuit, a transistor in the compensation control circuit, a transistor in the driving circuit, a transistor in the first initialization circuit, a transistor in the second initialization circuit, and a transistor in the third initialization circuit are each an oxide thin film transistor.

In a second aspect, the present disclosure provides in some embodiments a pixel driving method for the above-mentioned pixel circuit. A display frame includes a first initialization stage and a compensation stage arranged one after another, and the pixel driving method includes: within the first initialization stage, writing, by the first initialization circuit, a first initial voltage from the first initial voltage terminal into the control terminal of the driving circuit under control of a reset control signal: within a data written-in time period, writing, by the data written-in circuit, a data voltage from the data line into the first terminal of the driving circuit under control of a written-in control signal: within the compensation stage, controlling, by the compensation control circuit, the control terminal of the driving circuit to be electrically connected to the second terminal of the driving circuit under control of a compensation control signal:

at the beginning of the data written-in time period, controlling, by the driving circuit, the first terminal of the driving circuit to be electrically connected to the second terminal of the driving circuit under control of a potential at the control terminal of the driving circuit, and charging the energy storage circuit via the data voltage to change the potential at the control terminal of the driving circuit until the first terminal of the driving circuit is electrically disconnected from the second terminal of the driving circuit: where the data written-in time period is the same as the compensation stage, or the data written-in time period is included in the compensation stage.

Optionally, the pixel circuit includes a second light-emission control circuit, a display period further includes a first light-emission stage arranged after the compensation stage, and the pixel driving method further includes: within the first light-emission stage, controlling, by the first light-emission control circuit, the first terminal of the driving circuit to be electrically connected to the light-emitting element under control of a light-emission control signal, controlling, by the second light-emission control circuit, the first voltage terminal to be electrically connected to the second terminal of the driving circuit under control of the light-emission control signal, and driving, by the driving circuit, the light-emitting element to emit light.

Optionally, the pixel circuit further includes a second initialization circuit, and the pixel driving method further includes: within the compensation stage, writing, by the second initialization circuit, a second initial voltage from a second initial voltage terminal into the first electrode of the light-emitting element under control of an initial control signal, to control the light-emitting element not to emit light, reset a potential at the first electrode of the light-emitting element, and release residual charges at the first electrode of the light-emitting element.

Optionally, the pixel circuit further includes a third initialization circuit, and the pixel driving method further includes: within the first initialization stage, writing, by the third initialization circuit, a third initial voltage from a third initial voltage terminal into the second terminal of the driving circuit under control of the reset control signal.

Optionally, the display frame is a refresh frame, the display period further includes a maintaining frame, the maintaining frame includes a second initialization stage and a second light-emission stage arranged one after another, and the pixel driving method further includes: within the second initialization stage, writing, by the second initialization circuit, the second initial voltage from the second initial voltage terminal into the first electrode of the light-emitting element under control of the reset control signal, to control the light-emitting element not to emit light, reset the potential at the first electrode of the light-emitting element, and release residual charges at the first electrode of the light-emitting element: within the second light-emission stage, controlling, by the first light-emission control circuit, the first terminal of the driving circuit to be electrically connected to the light-emitting element under control of the light-emission control signal, controlling, by the second light-emission control circuit, the first voltage terminal to be electrically connected to the second terminal of the driving circuit under control of the light-emission control signal, and driving, by the driving circuit, the light-emitting element to emit light.

In a third aspect, the present disclosure provides in some embodiments a display device including the above-mentioned pixel circuit.

DETAILED DESCRIPTION

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the embodiments of the present disclosure, each transistor may be a triode, a thin film transistor (TFT), a field effect transistor (FET), or any other element having a same characteristic. In order to differentiate two electrodes of the transistor, apart from a control electrode, from each other, one of the two electrodes may be called as a first electrode, and the other may be called as a second electrode.

In actual use, when the transistor is a TFT or FET, the first electrode may be a drain electrode and the second electrode may be a source electrode, or the first electrode may be a source electrode and the second electrode may be a drain electrode.

Figure 1:
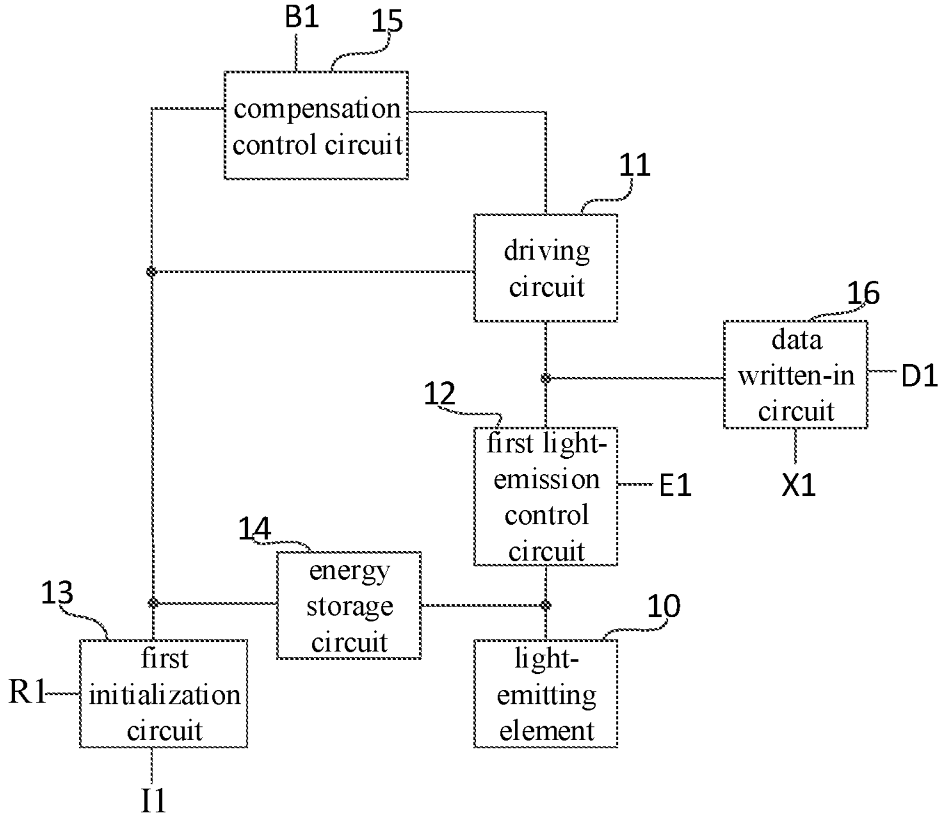
FIG. 1 is a schematic view showing a pixel circuit according to one embodiment of the present disclosure.

As shown in FIG. 1, a pixel circuit according to one embodiment of the present disclosure includes a light-emitting element 10, a driving circuit 11, a first light-emission control circuit 12, a first initialization circuit 13, an energy storage circuit 14, a compensation control circuit 15 and a data written-in circuit 16.

The first light-emission control circuit 12 is electrically connected to a light-emission control line E1, a first terminal of the driving circuit 11 and the light-emitting element 10, and configured to control the first terminal of the driving circuit 11 to be electrically connected to the light-emitting element 10 under control of a light-emission control signal from the light-emission control line E1.

The first initialization circuit 13 is electrically connected to a reset control line R1, a first initial voltage terminal I1 and a control terminal of the driving circuit 11, and configured to write a first initial voltage Vint1 from the first initial voltage terminal I1 into the control terminal of the driving circuit 11 under control of a reset control signal RS from the reset control line R1.

A first terminal of the energy storage circuit 14 is electrically connected to the control terminal of the driving circuit 11, a second terminal of the energy storage circuit 14 is electrically connected to a first electrode of the light-emitting element 10, and the energy storage circuit 14 is configured to store electric energy.

The data written-in circuit 16 is electrically connected to a written-in control line X1, a data line D1 and the first terminal of the driving circuit 11, and configured to write a data voltage Vdata from the data line D1 into the first terminal of the driving circuit 11 under control of a written-in control signal from the written-in control line X1.

The compensation control circuit 15 is electrically connected to a compensation control line B1, the control terminal of the driving circuit 11 and a second terminal of the driving circuit 11, and configured to control the control terminal of the driving circuit 11 to be electrically connected to the second terminal of the driving circuit 11 under control of a compensation control signal from the compensation control line B1.

In at least one embodiment of the present disclosure, when the pixel circuit operates in a high-frequency driving mode, the compensation control line B1 and the written-in control line X1 may receive a same control signal, and the compensation control line B1 and the written-in control line X1 may be a same control line, or, the compensation control line B1 and the written-in control line X1 may receive different control signals, and the compensation control line B1 and the written-in control line X1 may be different control lines.

When the pixel circuit operates in a low-frequency driving mode, the compensation control line B1 and the written-in control line X1 may receive different control signals, and the compensation control line B1 and the written-in control line X1 may be different control lines.

In at least one embodiment of the present disclosure, that the pixel circuit operates in the high-frequency driving mode refers to that a refresh frequency of the pixel circuit is relatively high. For example, the refresh frequency may be greater than a predetermined frequency, the predetermined frequency may be, but not limited to, greater than or equal to 30 Hz and smaller than or equal to 50 Hz:

That the pixel circuit operates in the low-frequency driving mode refers to that the refresh frequency of the pixel circuit is relatively low. For example, the refresh frequency may be smaller than the predetermined frequency.

The pixel circuit in the embodiments of the present disclosure differs from the related pixel circuit in structure, is capable of performing a threshold voltage compensation and is able to be applied to low-frequency driving.

During the operation of the pixel circuit in the embodiments of the present disclosure, a display frame may include a first initialization stage and a compensation stage arranged one after another.

Within the first initialization stage, the first initialization circuit 13 writes the first initial voltage Vint1 from the first initial voltage terminal I1 into the control terminal of the driving circuit 11 under control of the reset control signal RS;

Within a data written-in time period, the data written-in circuit 16 writes the data voltage Vdata from the data line D1 into the first terminal of the driving circuit 11 under control of the written-in control signal.

Within the compensation stage, the compensation control circuit 15 controls the control terminal of the driving circuit 11 to be electrically connected to the second terminal of the driving circuit 11 under control of the compensation control signal.

At the beginning of the data written-in time period, the driving circuit 11 controls the first terminal of the driving circuit 11 to be electrically connected to the second terminal of the driving circuit 11 under control of a potential at the control terminal of the driving circuit, and charges the energy storage circuit 14 via the data voltage to change the potential at the control terminal of the driving circuit 11 until the first terminal of the driving circuit 11 is electrically disconnected from the second terminal of the driving circuit 11, so as to realize the threshold voltage compensation.

The data written-in time period is the same as the compensation stage, or the data written-in time period is included in the compensation stage.

During the implementation, when the pixel circuit operates in the low-frequency driving mode, the display frame may be a refresh frame included in the display period. When the pixel circuit operates in the high-frequency driving mode, the display frame may be the display period.

Figure 2:
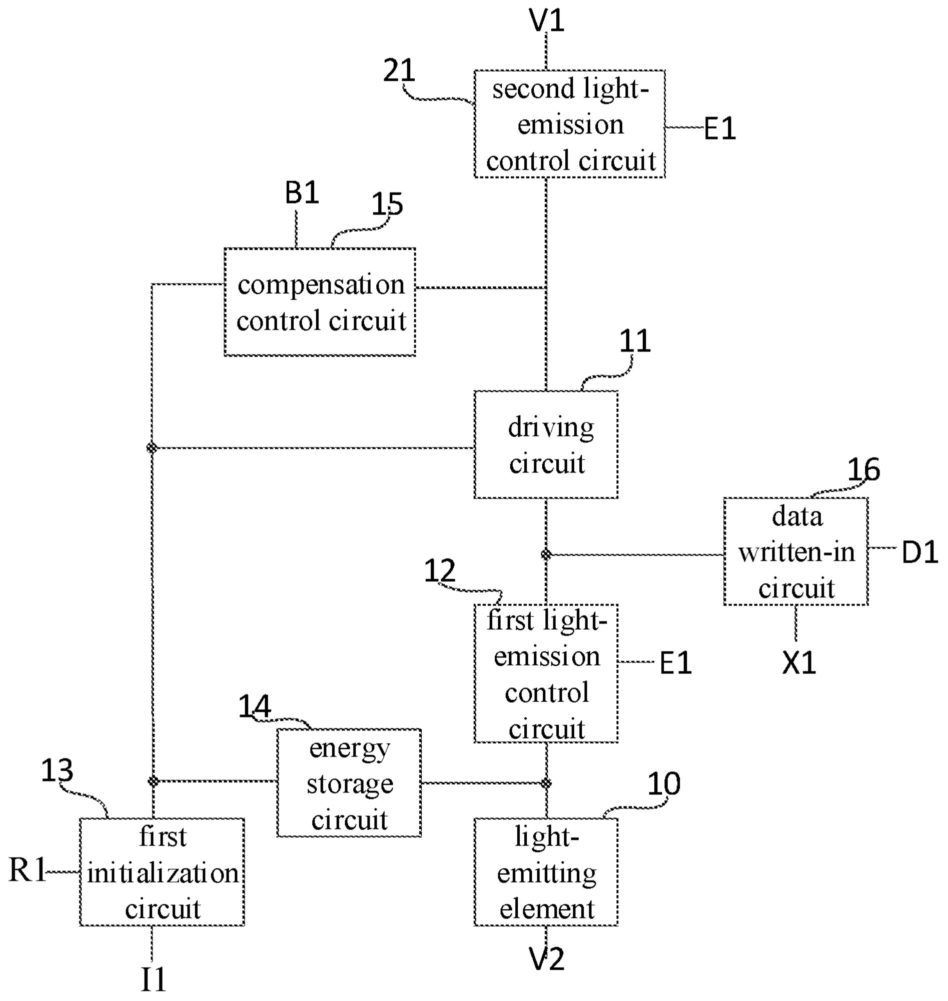
FIG. 2 is another schematic view showing the pixel circuit according to at least one embodiment of the present disclosure.

As shown in FIG. 2, on the basis of the pixel circuit in FIG. 1, the pixel circuit may further include a second light-emission control circuit 21.

The second light-emission control circuit 21 is electrically connected to the light-emission control line E1, a first voltage terminal V1 and the second terminal of the driving circuit 11, and configured to control the first voltage terminal V1 to be electrically connected to the second terminal of the driving circuit 11 under control of the light-emission control signal.

The first light-emission control circuit 12 is electrically connected to the first electrode of the light-emitting element 10, and a second electrode of the light-emitting element 10 is electrically connected to a second voltage terminal V2.

In a possible embodiment of the present disclosure, the first voltage terminal V1 may be, but not limited to, a high voltage terminal VDD, and the second voltage terminal V2 may be, but not limited to, a low voltage terminal VSS.

During the operation of the pixel circuit in FIG. 2, the display period may further include a first light-emission stage arranged after the compensation stage:

Within the first light-emission stage, the first light-emission control circuit 12 controls the first terminal of the driving circuit 11 to be electrically connected to the light-emitting element 10 under control of the light-emission control signal, the second light-emission control circuit 21 controls the first voltage terminal V1 to be electrically connected to the second terminal of the driving circuit 11 under control of the light-emission control signal, and the driving circuit 11 drives the light-emitting element 10 to emit light.

Figure 3:
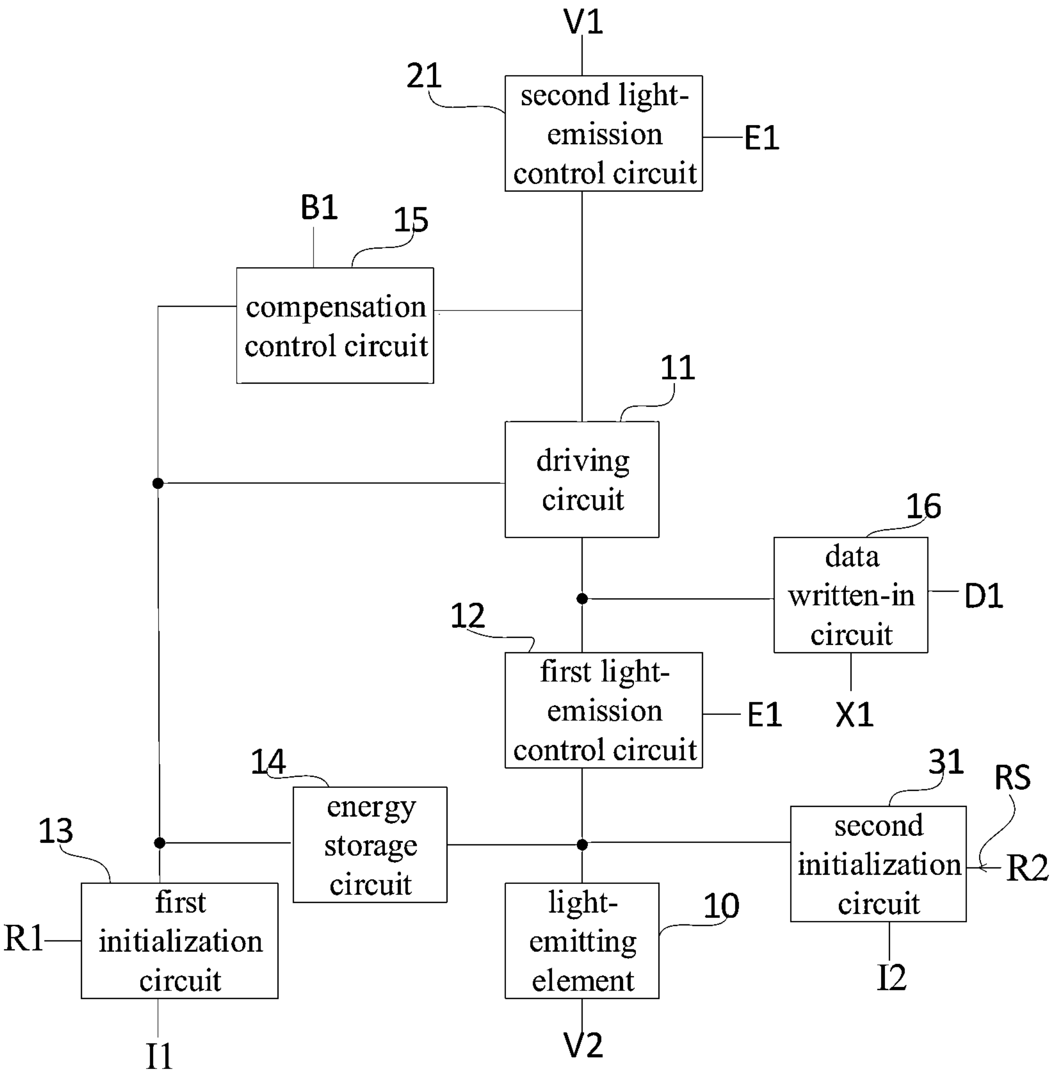
FIG. 3 is yet another schematic view showing the pixel circuit according to at least one embodiment of the present disclosure.

As shown in FIG. 3, on the basis of the pixel circuit in FIG. 2, the pixel circuit further includes a second initialization circuit 31.

The second initialization circuit 31 is electrically connected to an initial control line R2, a second initial voltage terminal 12 and the first electrode of the light-emitting element 10, and configured to write a second initial voltage Vint2 from the second initial voltage terminal 12 into the first electrode of the light-emitting element 10 under control of an initial control signal from the initial control line R2, so as to control the light-emitting element 10 not to emit light, reset a potential at the first electrode of the light-emitting element 10, and release residual charges at the first electrode of the light-emitting element 10.

During the operation of the pixel circuit in FIG. 3, within the compensation stage, the second initialization circuit 31 writes the second initial voltage Vint2 from the second initial voltage terminal 12 into the first electrode of the light-emitting element 10 under control of the initial control signal, to control the light-emitting element 10 not to emit light, and release residual charges at the first electrode of the light-emitting element 10.

When the pixel circuit in FIG. 3 operates in the high-frequency driving mode, the initial control line R2 may receive, but not limited to, a same control signal as the compensation control line B1, and the initial control line R2 and the compensation control line B1 may be, but not limited to, a same control line.

When the pixel circuit in FIG. 3 operates in the low-frequency driving mode, the initial control line R2 and the compensation control line B1 may receive different control signals, and the initial control line R2 and the compensating control line B1 may be different control lines.

In at least one embodiment of the present disclosure, when the pixel circuit operates in the low-frequency driving mode, the display frame may be the refresh frame, and the display period may further include a maintaining frame, the maintaining frame may include a second initialization stage and a second light-emission stage arranged one after another.

Within the second initialization stage, the second initialization circuit 31 writes the second initial voltage Vint2 from the second initial voltage terminal 12 into the first electrode of the light-emitting element 10 under control of the reset control signal RS, to control the light-emitting element 10 not to emit light, and release residual charges at the first electrode of the light-emitting element 10.

Within the second light-emission stage, the first light-emission control circuit 12 controls the first terminal of the driving circuit 11 to be electrically connected to the light-emitting element 10 under control of the light-emission control signal, and the second light-emission control circuit 21 controls the first voltage terminal V1 to be electrically connected to the second terminal of the driving circuit 11 under control of the light-emission control signal, and the driving circuit 11 drives the light-emitting element to emit light.

In a possible embodiment of the present disclosure, the data written-in circuit includes a first transistor, the compensation control circuit includes a second transistor, the energy storage circuit includes a storage capacitor, and the driving circuit includes a driving transistor.

A control electrode of the first transistor is electrically connected to the written-in control line, a first electrode of the first transistor is electrically connected to the data line, and a second electrode of the first transistor is electrically connected to the first terminal of the driving circuit.

A control electrode of the second transistor is electrically connected to the compensation control line, a first electrode of the second transistor is electrically connected to the control terminal of the driving circuit, and a second electrode of the second transistor is electrically connected to the second terminal of the driving circuit.

A first terminal of the storage capacitor is electrically connected to the control terminal of the driving circuit, and a second terminal of the storage capacitor is electrically connected to the first electrode of the light-emitting element.

A control electrode of the driving transistor is the control terminal of the driving circuit, a first electrode of the driving transistor is the first terminal of the driving circuit, and a second electrode of the driving transistor is the second terminal of the driving circuit.

In a possible embodiment of the present disclosure, the second light-emission control circuit includes a third transistor, and the first light-emission control circuit includes a fourth transistor.

A control electrode of the third transistor is electrically connected to the light-emission control line, a first electrode of the third transistor is electrically connected to the first voltage terminal, and a second electrode of the third transistor is electrically connected to the second terminal of the driving circuit.

A control electrode of the fourth transistor is electrically connected to the light-emission control line, a first electrode of the fourth transistor is electrically connected to the first terminal of the driving circuit, and a second electrode of the fourth transistor is electrically connected to the first electrode of the light-emitting element.

In a possible embodiment of the present disclosure, the first initialization circuit includes a fifth transistor. A control electrode of the fifth transistor is electrically connected to the reset control line, a first electrode of the fifth transistor is electrically connected to the first initial voltage terminal, and a second electrode of the fifth transistor is electrically connected to the control terminal of the driving circuit.

In a possible embodiment of the present disclosure, the second initialization circuit includes a sixth transistor. A control electrode of the sixth transistor is electrically connected to the initial control line, a first electrode of the sixth transistor is electrically connected to the second initial voltage terminal, and a second electrode of the sixth transistor is electrically connected to the first electrode of the light-emitting element.

Figure 4:
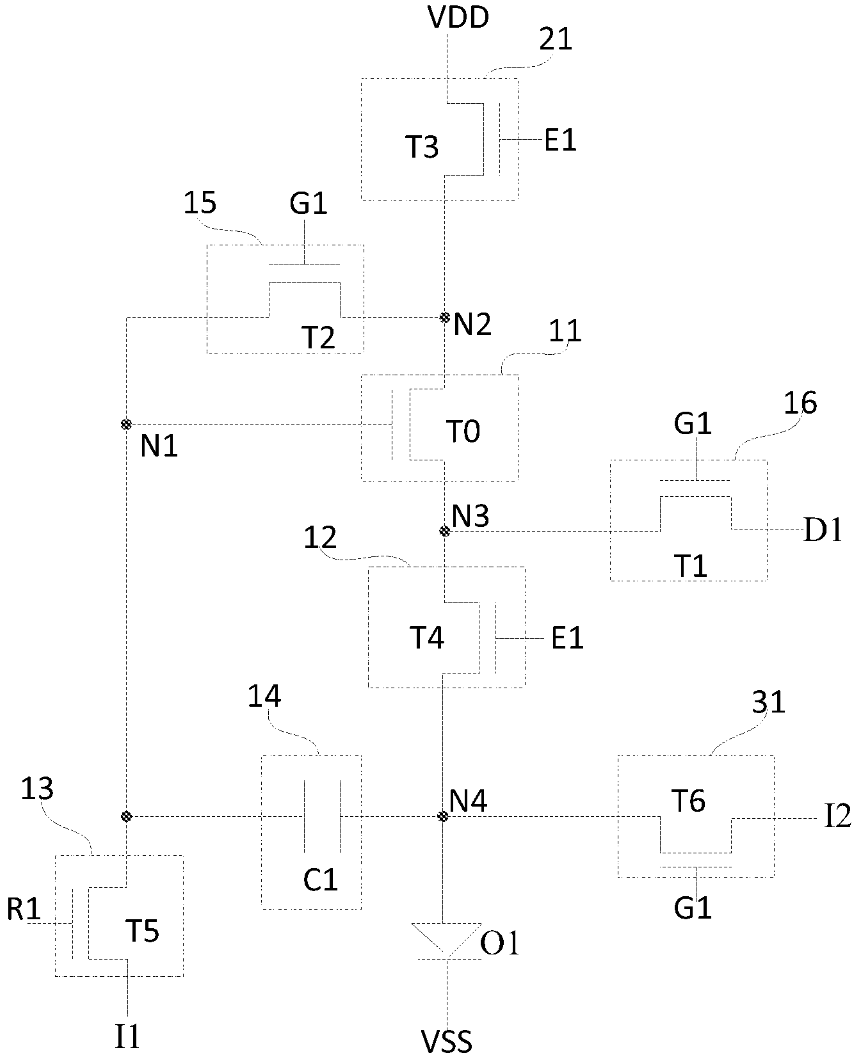
FIG. 4 is a circuit diagram of the pixel circuit according to at least one embodiment of the present disclosure.

As shown in FIG. 4, on the basis of the pixel circuit in FIG. 3, the data written-in circuit 16 includes a first transistor T1, the compensation control circuit 15 includes a second transistor T2, the energy storage circuit 14 includes a storage capacitor C1, the driving circuit 11 includes a driving transistor T0, and the light-emitting element is an organic light-emitting diode O1.

A gate electrode of the first transistor T1 is electrically connected to a first scanning control line G1, a drain electrode of the first transistor T1 is electrically connected to the data line D1, and a source electrode of the first transistor T1 is electrically connected to a source electrode of the driving transistor T0.

A gate electrode of the second transistor T2 is electrically connected to the first scanning control line G1, a drain electrode of the second transistor T2 is electrically connected to a gate electrode of the driving transistor T0, and a source electrode of the second transistor T2 is electrically connected to a drain electrode of the driving transistor T0.

A first terminal of the storage capacitor C1 is electrically connected to the gate electrode of the drive transistor T0, and a second terminal of the storage capacitor C1 is electrically connected to an anode of the organic light-emitting diode O1.

The second light-emission control circuit 21 includes a third transistor T3, and the first light-emission control circuit 12 includes a fourth transistor T4.

A gate electrode of the third transistor T3 is electrically connected to the light-emission control line E1, a drain electrode of the third transistor T3 is electrically connected to the high voltage terminal VDD, and a source electrode of the third transistor T3 is electrically connected to a drain electrode of the driving transistor T0.

A gate electrode of the fourth transistor T4 is electrically connected to the light-emission control line E1, a drain electrode of the fourth transistor T4 is electrically connected to the source electrode of the driving transistor T0, and a source electrode of the fourth transistor T4 is electrically connected to the anode of the organic light-emitting diode O1.

The first initialization circuit 13 includes a fifth transistor T5, a gate electrode of the fifth transistor T5 is electrically connected to the reset control line R1, a drain electrode of the fifth transistor T5 is electrically connected to the first initial voltage terminal I1, and a source electrode of the fifth transistor T5 is electrically connected to the gate electrode of the driving transistor T0.

The second initialization circuit 32 includes a sixth transistor T6, a gate electrode of the sixth transistor T6 is electrically connected to the first scanning control line G1, a drain electrode of the sixth transistor T6 is electrically connected to the second initial voltage terminal 12, and a source electrode of the sixth transistor T6 is electrically connected to the anode of the organic light-emitting diode O1.

A cathode of the organic light-emitting diode O1 is electrically connected to the low voltage terminal VSS.

The pixel circuit in FIG. 4 is a brand new 7T1C pixel circuit which is capable of efficiently supporting the characteristic of full oxide devices.

In the pixel circuit in FIG. 4, T1, T2, T3, T4, T5, T6 and T0 are each, but not limited to, an oxide transistor, and T1, T2, T3, T4, T5, T6 and T0 are each, but not limited to, an NMOS (N-type metal-oxide-semiconductor) transistor.

In the pixel circuit in FIG. 4, the compensation control line, the written-in control line and the initial control line are a same control line, i.e., the first scanning control line G1, and the pixel circuit in FIG. 4 is able to operate in the high-frequency driving mode.

In FIG. 4, N1 denotes a first node, and the first node N1 is electrically connected to the gate electrode of T0. N2 denotes a second node, and the second node N2 is electrically connected to the drain electrode of T0. N3 denotes a third node, and the third node N3 is electrically connected to the source electrode of T0. N4 denotes a fourth node, and the fourth node N4 is electrically connected to the anode of O1.

Figure 5:
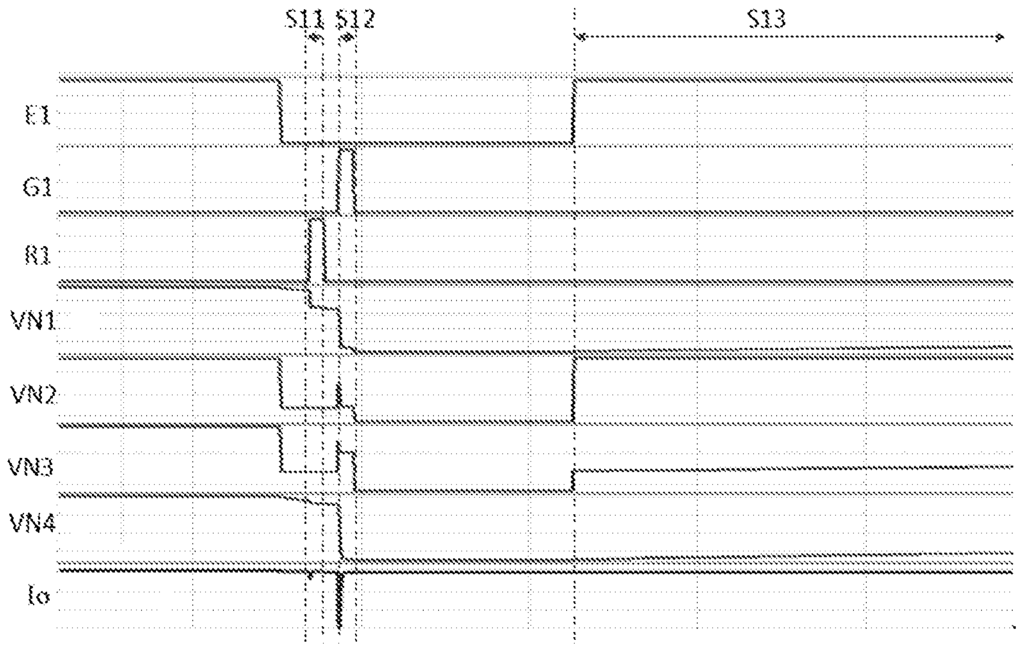
FIG. 5 is a timing sequence diagram of the pixel circuit in FIG. 4.

As shown in FIG. 5, when the pixel circuit in FIG. 4 operates in the high-frequency driving mode, the display frame may include a first initialization stage S11, a compensation stage S12 and a first light-emission stage S13 arranged one after another.

Within the first initialization phase S11, a low voltage signal is applied to E1, a high voltage signal is applied to R1, a low voltage signal is applied to G1, T5 is turned on, a first initial voltage Vint1 is applied to I1 and written into the first node N1, so that T0 is turned on at the beginning of the compensation stage S12.

Within the compensation stage S12, a low voltage signal is applied to E1, a low voltage signal is applied to R1, a high voltage signal is applied to G1, T1, T2 and T6 are all turned on, and T5 is turned off. The data voltage Vdata is applied to the data line D1, and a second initial voltage Vint2 is applied to I2. The data voltage Vdata is written into the third node N3, and the first node N1 is controlled to be electrically connected to the second node N2. Vint2 is written into the fourth node N4 to enable O1 not to emit light, and release residual charges at the anode of O1.

At the beginning of the compensation phase S12, T0 is turned on, C1 is charged via the data voltage Vdata, so as to change a potential at the first node N1 until T0 is turned off. At this time, a potential at the third node N3 is Vdata, and the potential at the first node N1 and a potential at the second node N2 are each Vdata+Vth. A potential at the fourth node N4 is VINT2, and Vth is a threshold voltage of T0.

Within the first light-emission stage S13, a high voltage signal is applied to E1, a low voltage signal is applied to R1 and G1, T3 and T4 are turned on, and T0 drives O1 to emit light.

Within the first light-emission stage S13, the potential at the fourth node N4 is Vo+Vs: the potential at the first node N1 becomes Vdata+Vth+Vo+Vs−Vint2, and Vgs is equal to Vdata+Vth−Vint2, where Vo is a turning-on voltage of O1, and Vs is a voltage value of a low voltage signal from the low voltage terminal VSS.

Within the first light-emission stage S13, a driving current Io that T0 drives O1 to emit light is equal to 0.5K $(Vdata-Vint2)^2$, where K is a current coefficient of T0. Based on the formula of Io, Io is independent of the threshold voltage Vth of T0, so as to realize the threshold voltage compensation.

In FIG. 5, VN1 is the potential at the first node N1, VN2 is the potential at the second node N2, VN3 is the potential at the third node N3, and VN4 is the potential at the fourth node N4.

In at least one embodiment of the present disclosure, Vint1 may be greater than or equal to 0V and smaller than or equal to 10V. For example, Vint1 may be, but limited to, 0V, 2V, 4V, 5V, 6V, 8V or 10V.

Vint2 may be greater than or equal to −10V and smaller than or equal to 0V. For example, Vint2 may be, but limited to, −10V, −8V, −7V, −6V, −4V, −2V or 0V.

In a possible embodiment of the present disclosure, Vint2 may be, but limited to, the same with voltage value of the low voltage signal from the low voltage terminal VSS.

Figure 6:
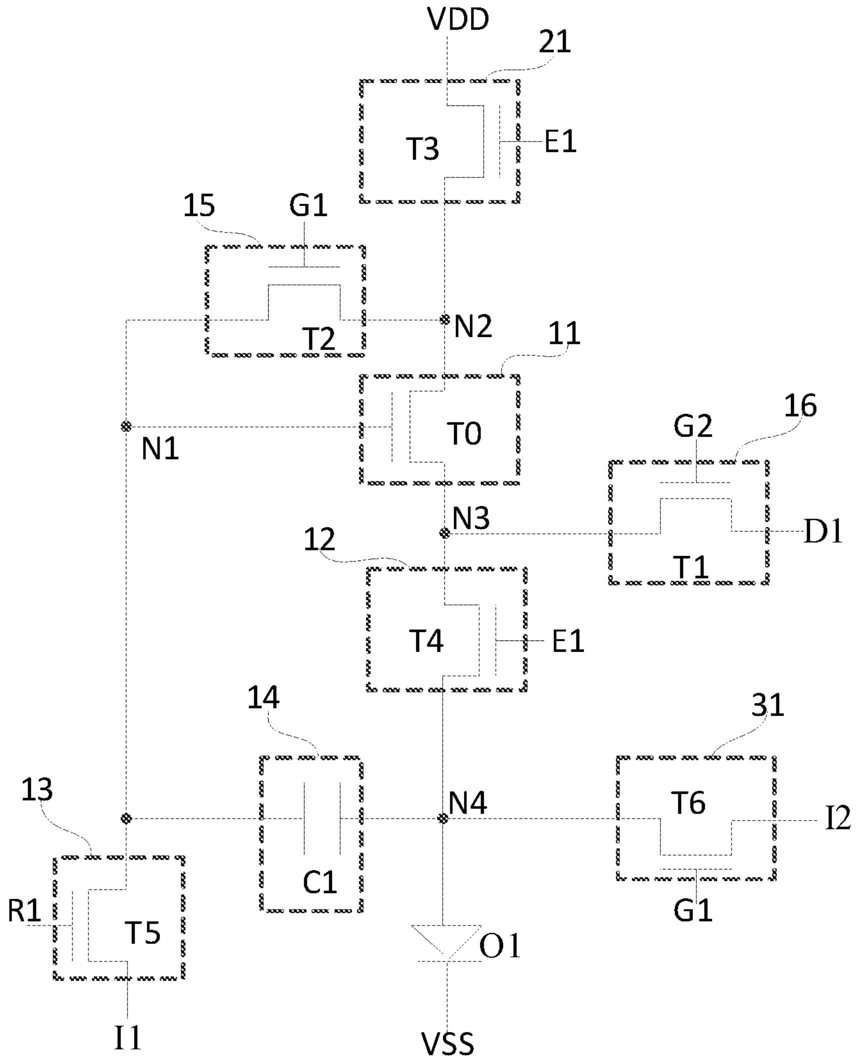
FIG. 6 is another circuit diagram of the pixel circuit according to at least one embodiment of the present disclosure.

As shown in FIG. 6, on the basis of the pixel circuit in FIG. 3, the data written-in circuit 16 includes a first transistor T1, the compensation control circuit 15 includes a second transistor T2, the energy storage circuit 14 includes a storage capacitor C1, the driving circuit 11 includes a driving transistor T0, and the light-emitting element is an organic light-emitting diode O1.

A gate electrode of the first transistor T1 is electrically connected to a second scanning control line G2, a drain electrode of the first transistor T1 is electrically connected to the data line D1, and a source electrode of the first transistor T1 is electrically connected to a source electrode of the driving transistor T0.

A gate electrode of the second transistor T2 is electrically connected to the first scanning control line G1, a drain electrode of the second transistor T2 is electrically connected to a gate electrode of the driving transistor T0, and a source electrode of the second transistor T2 is electrically connected to a drain electrode of the driving transistor T0.

A first terminal of the storage capacitor C1 is electrically connected to the gate electrode of the drive transistor T0, and a second terminal of the storage capacitor C1 is electrically connected to an anode of the organic light-emitting diode O1.

The second light-emission control circuit 21 includes a third transistor T3, and the first light-emission control circuit 12 includes a fourth transistor T4.

A gate electrode of the third transistor T3 is electrically connected to the light-emission control line E1, a drain electrode of the third transistor T3 is electrically connected to the high voltage terminal VDD, and a source electrode of the third transistor T3 is electrically connected to a drain electrode of the driving transistor T0.

A gate electrode of the fourth transistor T4 is electrically connected to the light-emission control line E1, a drain electrode of the fourth transistor T4 is electrically connected to the source electrode of the driving transistor T0, and a source electrode of the fourth transistor T4 is electrically connected to the anode of the organic light-emitting diode O1.

The first initialization circuit 13 includes a fifth transistor T5, a gate electrode of the fifth transistor T5 is electrically connected to the reset control line R1, a drain electrode of the fifth transistor T5 is electrically connected to the first initial voltage terminal I1, and a source electrode of the fifth transistor T5 is electrically connected to the gate electrode of the driving transistor T0.

The second initialization circuit 32 includes a sixth transistor T6, a gate electrode of the sixth transistor T6 is electrically connected to the first scanning control line G1, a drain electrode of the sixth transistor T6 is electrically connected to the second initial voltage terminal 12, and a source electrode of the sixth transistor T6 is electrically connected to the anode of the organic light-emitting diode O1.

A cathode of the organic light-emitting diode O1 is electrically connected to the low voltage terminal VSS.

The pixel circuit in FIG. 6 is a brand new 7T1C pixel circuit which is capable of efficiently supporting the characteristic of full oxide devices.

In the pixel circuit in FIG. 6, T1, T2, T3, T4, T5, T6 and T0 are each, but not limited to, an oxide transistor, and T1, T2, T3, T4, T5, T6 and T0 are each, but not limited to, an NMOS (N-type metal-oxide-semiconductor) transistor.

In the pixel circuit in FIG. 6, the compensation control line and the initial control line are a same control line, i.e., being the first scanning control line G1 and the writing control line is the second scanning control line G2, and the pixel circuit in FIG. 6 is able to operate in the high-frequency driving mode and the low-frequency driving mode.

In FIG. 6, N1 denotes a first node, and the first node N1 is electrically connected to the gate electrode of T0. N2 denotes a second node, and the second node N2 is electrically connected to the drain electrode of T0. N3 denotes a third node, and the third node N3 is electrically connected to the source electrode of T0. N4 denotes a fourth node, and the fourth node N4 is electrically connected to the anode of O1.

In the pixel circuit in FIG. 6, the fifth transistor T5 operates under the control of the reset control signal RS from the reset control line R1, so as to freely adjust a time period for resetting the potential at the gate electrode of the driving transistor T0 via the first initial voltage Vint1 from the first initial voltage terminal I1. The sixth transistor T6 operates under the control of a first scanning control signal from the first scanning control line G1 and is capable of operating in the low-frequency driving mode, so as to reset the anode of O1. The first transistor T1 operates under the control of a second scanning control signal from the second scanning control line G2 for data voltage written-in, and the first transistor T1 and the sixth transistor T6 operate under the control of different control signals, so as to, when operating in the low-frequency driving mode, maintain the first transistor T1 to be in an off state during the maintaining frame and control the sixth transistor T6 to be turned on during the second initialization stage in the maintaining frame.

Figure 7:
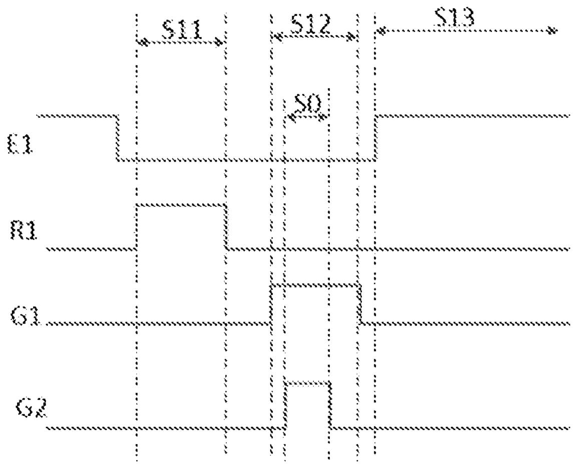
FIG. 7 is a first timing sequence diagram of the pixel circuit in FIG. 6.

As shown in FIG. 7, when the pixel circuit in FIG. 6 operates in the high-frequency driving mode, the display frame may include a first initialization stage S11, a compensation stage S12 and a first light-emission stage S13 arranged one after another, and the compensation stage S12 includes a data written-in time period S0.

Within the first initialization phase S11, a low voltage signal is applied to E1, a high voltage signal is applied to R1, a low voltage signal is applied to G1, a low voltage signal is applied to G2, T5 is turned on, a first initial voltage Vint1 is applied to I1 and written into the first node N1, so that T0 is turned on at the beginning of the data written-in time period S0.

Within the compensation stage S12, a low voltage signal is applied to E1, a low voltage signal is applied to R1, a high voltage signal is applied to G1, T2 and T6 are all turned on, and T5 is turned off. A second initial voltage Vint2 is applied to I2. The first node N1 is electrically connected to the second node N2. Vint2 is written into the fourth node N4 to enable O1 not to emit light, and release residual charges at the anode of O1.

Within the data written-in time period S0, a high voltage signal is applied to G2, a low voltage signal is applied to R1 and E1, and the data voltage Vdata is applied to the data line D1, so as to write the data voltage Vdata into the third node N3.

At the beginning of the data written-in time period S0, T0 is turned on, C1 is charged via the data voltage Vdata, so as to change a potential at the first node N1 until T0 is turned off. At this time, a potential at the third node N3 is Vdata, and the potential at the first node N1 and a potential at the second node N2 are each Vdata+Vth. A potential at the fourth node N4 is VINT2, and Vth is a threshold voltage of T0.

Within the first light-emission stage S13, a high voltage signal is applied to E1, a low voltage signal is applied to R1, G1 and G2, T3 and T4 are turned on, and T0 drives O1 to emit light.

Within the first light-emission stage S13, the potential at the fourth node N4 is Vo+Vs, the potential at the first node N1 becomes Vdata+Vth+Vo+Vs−Vint2, and Vgs is equal to Vdata+Vth−Vint2, where Vo is a turning-on voltage of O1, and Vs is a voltage value of a low voltage signal from the low voltage terminal VSS.

Within the first light-emission stage S13, a driving current Io that T0 drives O1 to emit light is equal to 0.5K $(Vdata-Vint2)^2$, where K is a current coefficient of T0. Based on the formula of Io, Io is independent of the threshold voltage Vth of T0, so as to realize the threshold voltage compensation.

Figure 8:
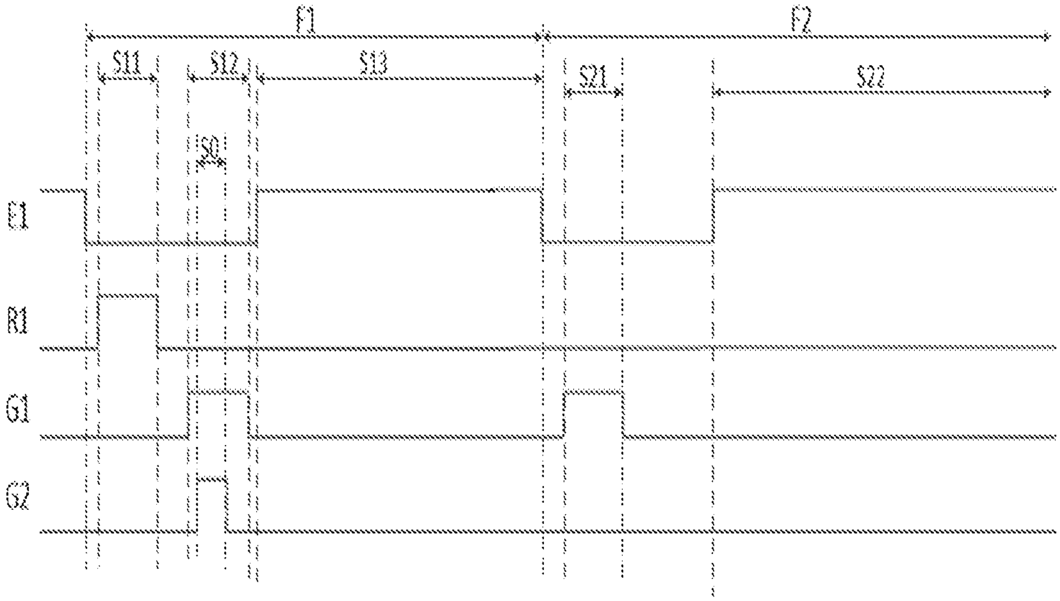
FIG. 8 is a second timing sequence diagram of the pixel circuit in FIG. 6.

As shown in FIG. 8, when the pixel circuit in FIG. 6 operates in the low-frequency driving mode, the display period may include a refresh frame F1 and at least one maintaining frame F2, the refresh frame F1 may include a first initialization stage S11, a compensation stage S12 and a first light-emission stage S13 arranged one after another, the compensation stage S12 includes a data written-in time period S0, and the maintaining frame F2 includes a second initialization stage S21 and a second light-emission stage S22.

Within the first initialization phase S11, a low voltage signal is applied to E1, a high voltage signal is applied to R1, a low voltage signal is applied to G1, a low voltage signal is applied to G2, T5 is turned on, a first initial voltage Vint1 is applied to I1 and written into the first node N1, so that T0 is turned on at the beginning of the data written-in time period S0.

Within the compensation stage S12, a low voltage signal is applied to E1, a low voltage signal is applied to R1, a high voltage signal is applied to G1, T2 and T6 are all turned on, and T5 is turned off. A second initial voltage Vint2 is applied to I2. The first node N1 is electrically connected to the second node N2. Vint2 is written into the fourth node N4 to enable O1 not to emit light, and release residual charges at the anode of O1.

Within the data written-in time period S0, a high voltage signal is applied to G2, a low voltage signal is applied to R1 and E1, and the data voltage Vdata is applied to the data line D1, so as to write the data voltage Vdata into the third node N3.

At the beginning of the data written-in time period S0, T0 is turned on, C1 is charged via the data voltage Vdata, so as to change a potential at the first node N1 until T0 is turned off. At this time, a potential at the third node N3 is Vdata, and the potential at the first node N1 and a potential at the second node N2 are each Vdata+Vth. A potential at the fourth node N4 is VINT2, and Vth is a threshold voltage of T0.

Within the first light-emission stage S13, a high voltage signal is applied to E1, a low voltage signal is applied to R1, G1 and G2, T3 and T4 are turned on, and T0 drives O1 to emit light.

Within the first light-emission stage S13, the potential at the fourth node N4 is Vo+Vs, the potential at the first node N1 becomes Vdata+Vth+Vo+Vs−Vint2, and Vgs is equal to Vdata+Vth−Vint2, where Vo is a turning-on voltage of O1, and Vs is a voltage value of a low voltage signal from the low voltage terminal VSS.

Within the first light-emission stage S13, a driving current Io that T0 drives O1 to emit light is equal to 0.5K $(Vdata-Vint2)^2$, where K is a current coefficient of T0. Based on the formula of Io, Io is independent of the threshold voltage Vth of T0, so as to realize the threshold voltage compensation.

Within the second initialization stage S21, a low voltage signal is applied to E1, a low voltage signal is applied to R1 and G2, a high voltage signal is applied to G1, T6 and T2 are turned on. The second initial voltage Vint2 is applied to I2 and written into the anode of O1, so as to control O1 not to emit light, reset the potential at the anode of O1, and release residual charges at the anode of O1. Since T3 and T4 are each in an off-state at this time, the display is not adversely affected when T2 is turned on.

Within the second light-emission stage S22, a high voltage signal is applied to E1, a low voltage signal is applied to R1, G1, G2 and G3, T3 and T4 are turned on, and T0 drives O1 to emit light.

Within the maintaining frame F2, a low voltage signal is applied to G2, so as to turn off T1 and stop the data voltage written-in, thereby maintaining the display at the brightness of the refresh frame.

When the pixel circuit in FIG. 6 operates in the low-frequency driving mode, prior to the second light-emission stage in the maintaining frame F1, within the second initialization stage in the maintaining frame F1, T6 is turned on to reset the potential at the anode of O1, so that the potential at the anode of O1 is maintained as the same before T0 drives O1 to emit light in each maintaining frame, thereby avoiding the flicker phenomenon in the low-frequency display.

Figure 9:
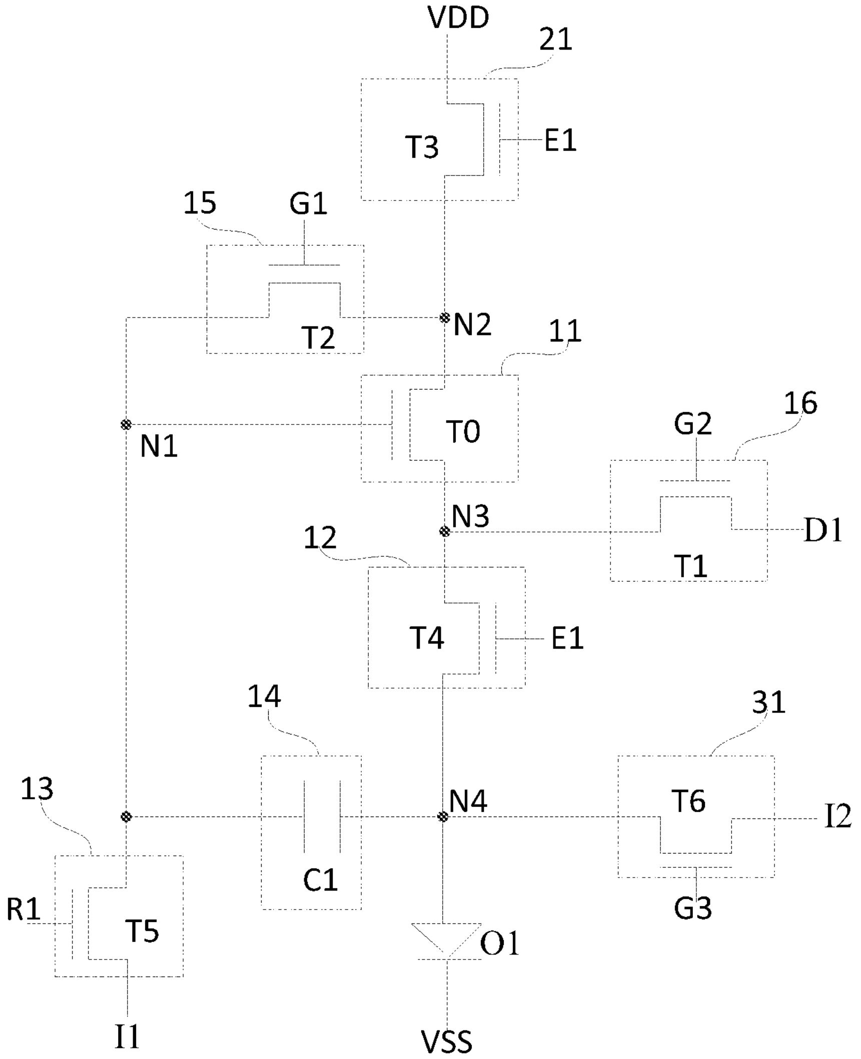
FIG. 9 is yet another circuit diagram of the pixel circuit according to at least one embodiment of the present disclosure.

As shown in FIG. 9, on the basis of the pixel circuit in FIG. 3, the data written-in circuit 16 includes a first transistor T1, the compensation control circuit 15 includes a second transistor T2, the energy storage circuit 14 includes a storage capacitor C1, the driving circuit 11 includes a driving transistor T0, and the light-emitting element is an organic light-emitting diode O1.

A gate electrode of the first transistor T1 is electrically connected to a second scanning control line G2, a drain electrode of the first transistor T1 is electrically connected to the data line D1, and a source electrode of the first transistor T1 is electrically connected to a source electrode of the driving transistor T0.

A gate electrode of the second transistor T2 is electrically connected to the first scanning control line G1, a drain electrode of the second transistor T2 is electrically connected to a gate electrode of the driving transistor T0, and a source electrode of the second transistor T2 is electrically connected to a drain electrode of the driving transistor T0.

A first terminal of the storage capacitor C1 is electrically connected to the gate electrode of the drive transistor T0, and a second terminal of the storage capacitor C1 is electrically connected to an anode of the organic light-emitting diode O1.

The second light-emission control circuit 21 includes a third transistor T3, and the first light-emission control circuit 12 includes a fourth transistor T4.

A gate electrode of the third transistor T3 is electrically connected to the light-emission control line E1, a drain electrode of the third transistor T3 is electrically connected to the high voltage terminal VDD, and a source electrode of the third transistor T3 is electrically connected to a drain electrode of the driving transistor T0.

A gate electrode of the fourth transistor T4 is electrically connected to the light-emission control line E1, a drain electrode of the fourth transistor T4 is electrically connected to the source electrode of the driving transistor T0, and a source electrode of the fourth transistor T4 is electrically connected to the anode of the organic light-emitting diode O1.

The first initialization circuit 13 includes a fifth transistor T5, a gate electrode of the fifth transistor T5 is electrically connected to the reset control line R1, a drain electrode of the fifth transistor T5 is electrically connected to the first initial voltage terminal I1, and a source electrode of the fifth transistor T5 is electrically connected to the gate electrode of the driving transistor T0.

The second initialization circuit 32 includes a sixth transistor T6, a gate electrode of the sixth transistor T6 is electrically connected to the third scanning control line G3, a drain electrode of the sixth transistor T6 is electrically connected to the second initial voltage terminal 12, and a source electrode of the sixth transistor T6 is electrically connected to the anode of the organic light-emitting diode O1.

A cathode of the organic light-emitting diode O1 is electrically connected to the low voltage terminal VSS.

The pixel circuit in FIG. 9 is a brand new 7T1C pixel circuit which is capable of efficiently supporting the characteristic of full oxide devices.

In the pixel circuit in FIG. 9, T1, T2, T3, T4, T5, T6 and T0 are each, but not limited to, an oxide transistor, and T1, T2, T3, T4, T5, T6 and T0 are each, but not limited to, an NMOS (N-type metal-oxide-semiconductor) transistor.

In FIG. 9, N1 denotes a first node, and the first node N1 is electrically connected to the gate electrode of T0. N2 denotes a second node, and the second node N2 is electrically connected to the drain electrode of T0. N3 denotes a third node, and the third node N3 is electrically connected to the source electrode of T0. N4 denotes a fourth node, and the fourth node N4 is electrically connected to the anode of O1.

In the pixel circuit in FIG. 9, the compensation control line, the written-in control line and the initial control line are different control lines. The compensation control line is the first scanning control line G1, the written-in control line is the second scanning control line G2, and the initial control line is the third scanning control line G3. The pixel circuit in FIG. 9 is able to operate in both the high-frequency and low-frequency driving modes.

In the pixel circuit in FIG. 9, the fifth transistor T5 operates under the control of the reset control signal RS from the reset control line R1, so as to freely adjust a time period for resetting the potential at the gate electrode of the driving transistor T0 via the first initial voltage Vint1 from the first initial voltage terminal I1. The sixth transistor T6 operates under the control of a third scanning control signal from the third scanning control line G3 and is capable of operating in the low-frequency driving mode, so as to reset the anode of O1. The first transistor T1 operates under the control of the second scanning control signal from the second scanning control line G2 for data voltage written-in, and the first transistor T1 and the sixth transistor T6 operate under the control of different control signals so as to, when operating in the low-frequency driving mode, maintain the first transistor T1 to be in an off state during the maintaining frame and control the sixth transistor T6 to be turned on during the second initialization stage in the maintaining frame.

Figure 10:
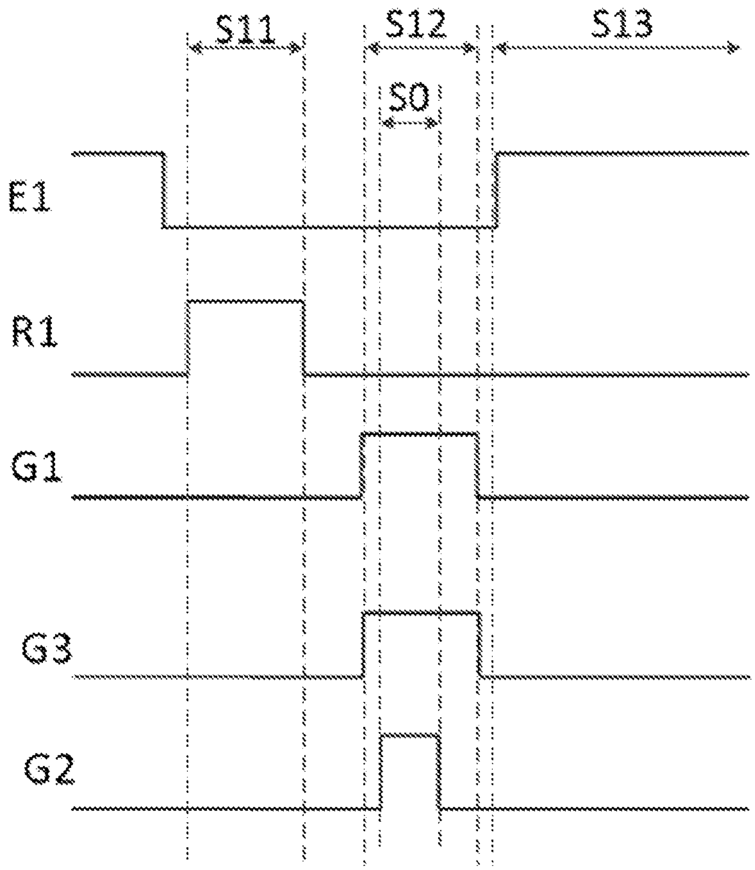
FIG. 10 is a first timing sequence diagram of the pixel circuit in FIG. 9.

As shown in FIG. 10, when the pixel circuit in FIG. 9 operates in the high-frequency driving mode, the display frame may include a first initialization stage S11, a compensation stage S12 and a first light-emission stage S13 arranged one after another, and the compensation stage S12 includes a data written-in time period S0.

Within the first initialization phase S11, a low voltage signal is applied to E1, a high voltage signal is applied to R1, a low voltage signal is applied to G1, G2 and G3, T5 is turned on, a first initial voltage Vint1 is applied to I1 and written into the first node N1, so that T0 is turned on at the beginning of the data written-in time period S0.

Within the compensation stage S12, a low voltage signal is applied to E1, a low voltage signal is applied to R1, a high voltage signal is applied to G1, a high voltage signal is applied to G3, T2 and T6 are turned on, and T5 is turned off. A second initial voltage Vint2 is applied to I2. The first node N1 is electrically connected to the second node N2. Vint2 is written into the fourth node N4 to enable O1 not to emit light, reset the potential at the anode of O1, and release residual charges at the anode of O1.

Within the data written-in time period S0, a high voltage signal is applied to G2, a low voltage signal is applied to R1 and E1, and the data voltage Vdata is applied to the data line D1, so as to write the data voltage Vdata into the third node N3.

At the beginning of the data written-in time period S0, T0 is turned on, C1 is charged via the data voltage Vdata, so as to change a potential at the first node N1 until T0 is turned off. At this time, a potential at the third node N3 is Vdata, and the potential at the first node N1 and a potential at the second node N2 are each Vdata+Vth. A potential at the fourth node N4 is VINT2, and Vth is a threshold voltage of T0.

Within the first light-emission stage S13, a high voltage signal is applied to E1, a low voltage signal is applied to R1, G1 and G2, T3 and T4 are turned on, and T0 drives O1 to emit light.

Within the first light-emission stage S13, the potential at the fourth node N4 is Vo+Vs, the potential at the first node N0 becomes Vdata+Vth+Vo+Vs−Vint2, and Vgs is equal to Vdata+Vth-Vint2, where Vo is a turning-on voltage of O1, and Vs is a voltage value of a low voltage signal from the low voltage terminal VSS.

Within the first light-emission stage S13, a driving current Io that T0 drives O1 to emit light is equal to 0.5K $(Vdata-Vint2)^2$, where K is a current coefficient of T0. Based on the formula of Io, Io is independent of the threshold voltage Vth of T0, so as to realize the threshold voltage compensation.

Figure 11:
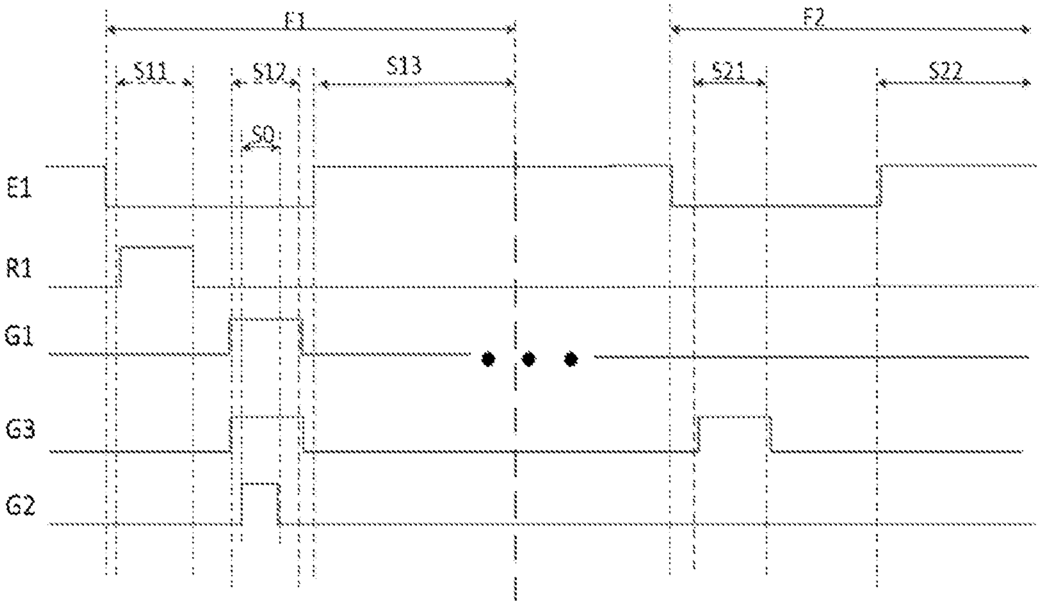
FIG. 11 is a second timing sequence diagram of the pixel circuit in FIG. 9.

As shown in FIG. 11, when the pixel circuit in FIG. 9 operates in the low-frequency driving mode, the display period may include a refresh frame F1 and at least one maintaining frame F2, the refresh frame F1 may include a first initialization stage S11, a compensation stage S12 and a first light-emission stage S13 arranged one after another, the compensation stage S12 includes a data written-in time period S0, and the maintaining frame F2 includes a second initialization stage S21 and a second light-emission stage S22.

Within the first initialization phase S11, a low voltage signal is applied to E1, a high voltage signal is applied to R1, a low voltage signal is applied to G1, G2 and G3, T5 is turned on, a first initial voltage Vint1 is applied to I1 and written into the first node N1, so that T0 is turned on at the beginning of the data written-in time period S0.

Within the compensation stage S12, a low voltage signal is applied to E1, a low voltage signal is applied to R1, a high voltage signal is applied to G1, a high voltage signal is applied to G3, T2 and T6 are turned on, and T5 is turned off. A second initial voltage Vint2 is applied to I2. The first node N1 is electrically connected to the second node N2. Vint2 is written into the fourth node N4 to enable O1 not to emit light, reset the potential at the anode of O1, and release residual charges at the anode of O1.

Within the data written-in time period S0, a high voltage signal is applied to G2, a low voltage signal is applied to R1 and E1, and the data voltage Vdata is applied to the data line D1, so as to write the data voltage Vdata into the third node N3.

At the beginning of the data written-in time period S0, T0 is turned on, C1 is charged via the data voltage Vdata, so as to change a potential at the first node N1 until T0 is turned off. At this time, a potential at the third node N3 is Vdata, and the potential at the first node N1 and a potential at the second node N2 are each Vdata+Vth. A potential at the fourth node N4 is VINT2, and Vth is a threshold voltage of T0.

Within the first light-emission stage S13, a high voltage signal is applied to E1, a low voltage signal is applied to R1, G1 and G2, T3 and T4 are turned on, and T0 drives O1 to emit light.

Within the first light-emission stage S13, the potential at the fourth node N4 is Vo+Vs, the potential at the first node N1 becomes Vdata+Vth+Vo+Vs−Vint2, and Vgs is equal to Vdata+Vth−Vint2, where Vo is a turning-on voltage of O1, and Vs is a voltage value of a low voltage signal from the low voltage terminal VSS.

Within the first light-emission stage S13, a driving current Io that T0 drives O1 to emit light is equal to 0.5K $(\mathrm{Vdata}-\mathrm{Vint2})^2$, where K is a current coefficient of T0. Based on the formula of Io, Io is independent of the threshold voltage Vth of T0, so as to realize the threshold voltage compensation.

Within the second initialization stage S21, a low voltage signal is applied to E1, a high voltage signal is applied to G3, a low voltage signal is applied to R1, G1 and G2, T6 is turned on. The second initial voltage Vint2 is applied to I2 and written into the anode of O1, so as to control O1 not to emit light, reset the potential at the anode of O1, and release residual charges at the anode of O1.

Within the second light-emission stage S22, a high voltage signal is applied to E1, a low voltage signal is applied to R1, G1, G2 and G3, T3 and T4 are turned on, and T0 drives O1 to emit light.

When the pixel circuit in FIG. 9 operates in the low-frequency driving mode, prior to the second light-emission stage in the maintaining frame F1, within the second initialization stage in the maintaining frame F1, T6 is turned on to reset the potential at the anode of O1, so that the potential at the anode of O1 is maintained as the same before T0 drives O1 to emit light in each maintaining frame, thereby avoiding the flicker phenomenon in the low-frequency display.

Optionally, in at least one embodiment of the present disclosure, the pixel circuit may further include a third initialization circuit, the third initialization circuit is electrically connected to the reset control line and a third initial voltage terminal, the third initialization circuit is electrically connected to the first terminal of the driving circuit or the second terminal of the driving circuit, and the third initialization circuit is configured to write a third initial voltage from the third initial voltage terminal into the first terminal of the driving circuit or the second terminal of the driving circuit under control of the reset control signal RS from the reset control line.

In at least one embodiment of the present disclosure, the pixel circuit may further include the third initialization circuit, and the third initialization circuit may write the third initial voltage to the first terminal of the driving circuit or the second terminal of the driving circuit when the first initialization circuit resets the potential at the control terminal of the driving circuit, so as to increase a bias voltage of the driving transistor of the driving circuit, thereby to mitigate the hysteresis phenomenon of the driving transistor.

In at least one embodiment of the present disclosure, when the first initial voltage Vint1 is of a positive value, the third initial voltage Vint3 may be of a negative value, so that when the first initialization circuit controls to write the first initial voltage Vint1 into the gate electrode of the driving transistor, and the third initialization circuit controls to write the third initial voltage Vint3 into the first electrode of the driving transistor or the second electrode of the driving transistor, a gate-source voltage of the driving transistor is much greater than the threshold voltage Vth of the driving transistor, thereby increasing the bias voltage of the driving transistor.

In a possible embodiment of the present disclosure, the third initialization circuit includes a seventh transistor, a control electrode of the seventh transistor is electrically connected to the reset control line, a first electrode of the seventh transistor is electrically connected to the third initial voltage terminal, and a second electrode of the seventh transistor is electrically connected to the first terminal of the driving circuit or the second terminal of the driving circuit.

Figure 12:
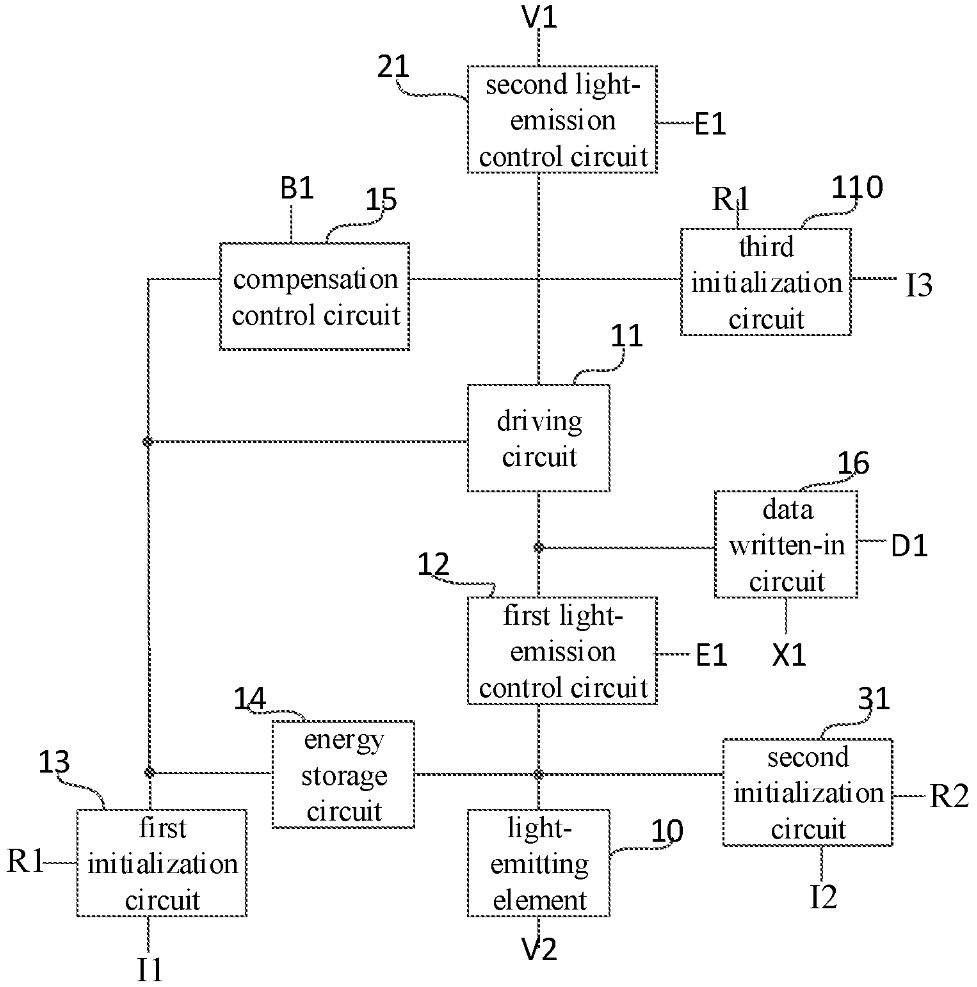
FIG. 12 is still yet another schematic view showing the pixel circuit according to at least one embodiment of the present disclosure.

As shown in FIG. 12, on the basis of the pixel circuit in FIG. 3, the pixel circuit may further include a third initialization circuit 110.

The third initialization circuit 110 is electrically connected to the reset control line R1 and a third initial voltage terminal I3, the third initialization circuit 110 is electrically connected to the second terminal of the driving circuit 11, and the third initialization circuit 110 is configured to write a third initial voltage Vint3 from the third initial voltage terminal I3 into the second terminal of the driving circuit 11 under control of the reset control signal RS from the reset control line R1.

During the operation of the pixel circuit in FIG. 12, within the first initialization stage, the third initialization circuit 110 writes the third initial voltage Vi3 from the third initial voltage terminal I3 into the second terminal of the driving circuit 11 under the control of the reset control signal RS.

Figure 13:
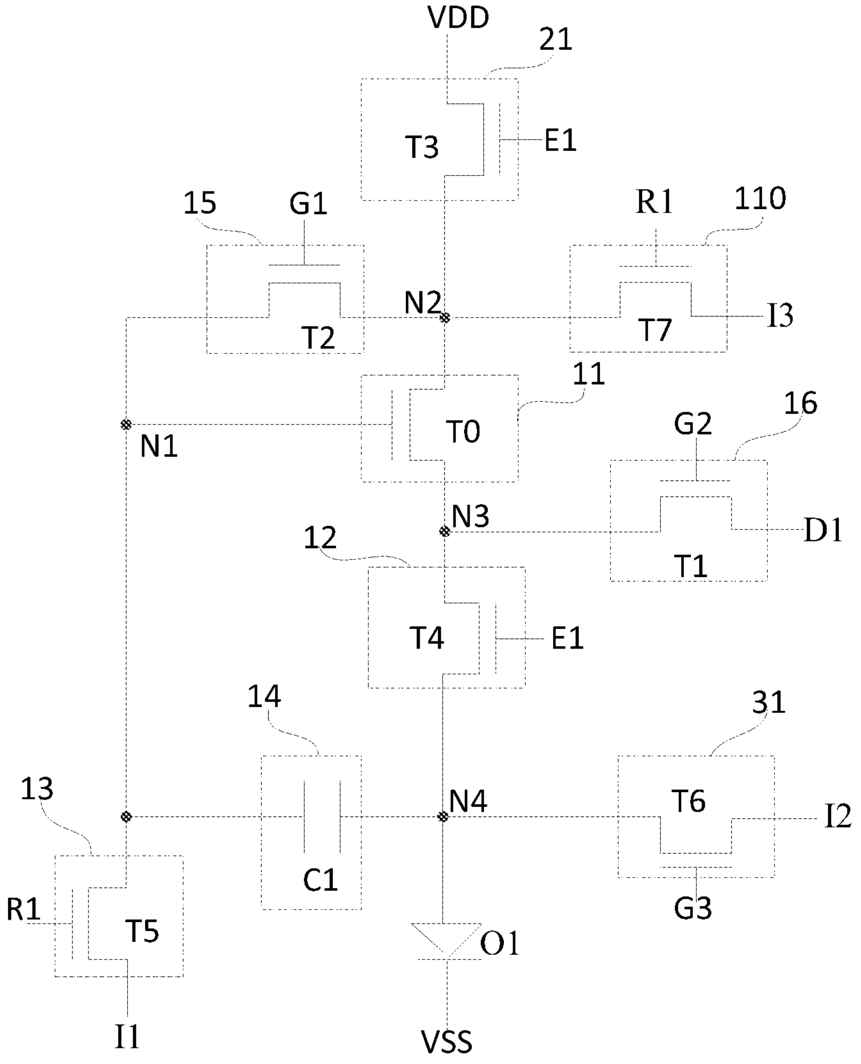
FIG. 13 is still yet another circuit diagram of the pixel circuit according to at least one embodiment of the present disclosure.

As shown in FIG. 13, on the basis of the pixel circuit in FIG. 9, the pixel circuit further includes a third initialization circuit 110

The third initialization circuit 110 includes a seventh transistor T7, a gate electrode of the seventh transistor T7 is electrically connected to the reset control line R1, a drain electrode of the seventh transistor T7 is electrically connected to the third initial voltage terminal I3, and a source electrode of the seventh transistor T7 is electrically connected to the second node N2.

In the pixel circuit in FIG. 13, all transistors are each an oxide transistor, and all transistors are each an NMOS transistor.

During the operation of the pixel circuit in FIG. 13, within the first initialization stage, a high voltage signal is applied to R1, T7 is turned on, the third initial voltage Vint3 is applied to the third initial voltage terminal I3 and written into the second node N2, T5 is turned on, and the first initial voltage Vint1 is applied to the first initial voltage terminal I1 and written into the gate electrode of T0, so as to increase the bias voltage of the driving transistor T0, thereby to mitigate the hysteresis phenomenon of the driving transistor T0.

In at least one embodiment of the present disclosure, a transistor in the light-emission control circuit, a transistor in the data written-in circuit, a transistor in the compensation control circuit, a transistor in the driving circuit, a transistor in the first initialization circuit, a transistor in the second initialization circuit, and a transistor in the third initialization circuit are each an oxide thin film transistor.

The present disclosure provides in some embodiments a display device including the above-mentioned pixel circuit.

The display device may be any product or member having a display function, e.g., a mobile phone, a flat-panel computer, a television, a display, a laptop computer, a digital photo frame or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A pixel driving method for a pixel circuit, wherein the pixel circuit comprises: a light-emitting element, a driving circuit, a first light-emission control circuit, a first initialization circuit, an energy storage circuit, a compensation control circuit and a data written-in circuit; wherein the first light-emission control circuit is electrically connected to a light-emission control line, a first terminal of the driving circuit and the light-emitting element, and configured to control the first terminal of the driving circuit to be electrically connected to the light-emitting element under control of a light-emission control signal from the light-emission control line;

the first initialization circuit is electrically connected to a reset control line, a first initial voltage terminal and a control terminal of the driving circuit, and configured to write a first initial voltage from the first initial voltage terminal into the control terminal of the driving circuit under control of a reset control signal from the reset control line;

a first terminal of the energy storage circuit is electrically connected to the control terminal of the driving circuit, a second terminal of the energy storage circuit is electrically connected to a first electrode of the light-emitting element, and the energy storage circuit is configured to store electric energy;

the data written-in circuit is electrically connected to a written-in control line, a data line and the first terminal of the driving circuit, and configured to write a data voltage from the data line into the first terminal of the driving circuit under control of a written-in control signal from the written-in control line;

the compensation control circuit is electrically connected to a compensation control line, the control terminal of the driving circuit and a second terminal of the driving circuit, and configured to control the control terminal of the driving circuit to be electrically connected to the second terminal of the driving circuit under control of a compensation control signal from the compensation control line;

wherein a display frame comprises a first initialization stage and a compensation stage arranged one after another, and the pixel driving method comprises:

within the first initialization stage, writing, by the first initialization circuit, a first initial voltage from the first initial voltage terminal into the control terminal of the driving circuit under control of a reset control signal;

within a data written-in time period, writing, by the data written-in circuit, a data voltage from the data line into the first terminal of the driving circuit under control of a written-in control signal;

within the compensation stage, controlling, by the compensation control circuit, the control terminal of the driving circuit to be electrically connected to the second terminal of the driving circuit under control of a compensation control signal;

at the beginning of the data written-in time period, controlling, by the driving circuit, the first terminal of the driving circuit to be electrically connected to the second terminal of the driving circuit under control of a potential at the control terminal of the driving circuit, and charging the energy storage circuit via the data voltage to change the potential at the control terminal of the driving circuit until the first terminal of the driving circuit is electrically disconnected from the second terminal of the driving circuit;

wherein the data written-in time period is same as the compensation stage, or the data written-in time period is comprised in the compensation stage;

wherein the pixel circuit comprises a second light-emission control circuit, a display period further comprises a first light-emission stage arranged after the compensation stage, and the pixel driving method further comprises:

within the first light-emission stage, controlling, by the first light-emission control circuit, the first terminal of the driving circuit to be electrically connected to the light-emitting element under control of a light-emission control signal, controlling, by the second light-emission control circuit, a first voltage terminal to be electrically connected to the second terminal of the driving circuit under control of the light-emission control signal, and driving, by the driving circuit, the light-emitting element to emit light;

wherein the pixel circuit further comprises a second initialization circuit, and the pixel driving method further comprises:

within the compensation stage, writing, by the second initialization circuit, a second initial voltage from a second initial voltage terminal into the first electrode of the light-emitting element under control of an initial control signal, to control the light-emitting element not to emit light, reset a potential at the first electrode of the light-emitting element, and release residual charges at the first electrode of the light-emitting element;

wherein the display frame is a refresh frame, the display period further comprises a maintaining frame, the maintaining frame comprises a second initialization stage and a second light-emission stage arranged one after another, and the pixel driving method further comprises:

within the second initialization stage, writing, by the second initialization circuit, the second initial voltage from the second initial voltage terminal into the first electrode of the light-emitting element under control of the reset control signal, to control the light-emitting element not to emit light, reset the potential at the first electrode of the light-emitting element, and release residual charges at the first electrode of the light-emitting element;

within the second light-emission stage, controlling, by the first light-emission control circuit, the first terminal of the driving circuit to be electrically connected to the light-emitting element under control of the light-emission control signal, controlling, by the second light-emission control circuit, the first voltage terminal to be electrically connected to the second terminal of the driving circuit under control of the light-emission control signal, and driving, by the driving circuit, the light-emitting element to emit light.

2. The pixel driving method according to claim 1, wherein the pixel circuit further comprises a third initialization circuit, and the pixel driving method further comprises:

within the first initialization stage, writing, by the third initialization circuit, a third initial voltage from a third initial voltage terminal into the second terminal of the driving circuit under control of the reset control signal.

3. A pixel circuit, comprising: a light-emitting element, a driving circuit, a first light-emission control circuit, a first initialization circuit, an energy storage circuit, a compensation control circuit and a data written-in circuit; wherein the first light-emission control circuit is electrically connected to a light-emission control line, a first terminal of the driving circuit and the light-emitting element, and configured to control the first terminal of the driving circuit to be electrically connected to the light-emitting element under control of a light-emission control signal from the light-emission control line;

the first initialization circuit is electrically connected to a reset control line, a first initial voltage terminal and a control terminal of the driving circuit, and configured to write a first initial voltage from the first initial voltage terminal into the control terminal of the driving circuit under control of a reset control signal from the reset control line;

a first terminal of the energy storage circuit is electrically connected to the control terminal of the driving circuit, a second terminal of the energy storage circuit is electrically connected to a first electrode of the light-emitting element, and the energy storage circuit is configured to store electric energy;

the data written-in circuit is electrically connected to a written-in control line, a data line and the first terminal of the driving circuit, and configured to write a data voltage from the data line into the first terminal of the driving circuit under control of a written-in control signal from the written-in control line;

the compensation control circuit is electrically connected to a compensation control line, the control terminal of the driving circuit and a second terminal of the driving circuit, and configured to control the control terminal of the driving circuit to be electrically connected to the second terminal of the driving circuit under control of a compensation control signal from the compensation control line;

wherein the pixel circuit further comprises a second light-emission control circuit; wherein the second light-emission control circuit is electrically connected to the light-emission control line, a first voltage terminal and the second terminal of the driving circuit, and configured to control the first voltage terminal to be electrically connected to the second terminal of the driving circuit under control of the light-emission control signal;

the first light-emission control circuit is electrically connected to the first electrode of the light-emitting element, and a second electrode of the light-emitting element is electrically connected to a second voltage terminal;

wherein the pixel circuit further comprises a second initialization circuit; wherein the second initialization circuit is electrically connected to an initial control line, a second initial voltage terminal and the first electrode of the light-emitting element, and configured to write a second initial voltage from the second initial voltage terminal into the first electrode of the light-emitting element under control of an initial control signal from the initial control line;

wherein when the pixel circuit operates in a low-frequency driving mode, a display frame is a refresh frame, a display period further comprises a maintaining frame, and the maintaining frame comprises a second initialization stage and a second light-emission stage arranged one after another:

within the second initialization stage, the second initialization circuit is configured to write the second initial voltage from the second initial voltage terminal into the first electrode of the light-emitting element under control of the reset control signal, to control the light-emitting element not to emit light, reset a potential at the first electrode of the light-emitting element, and release residual charges at the first electrode of the light-emitting element;

within the second light-emission stage, the first light-emission control circuit is configured to control the first terminal of the driving circuit to be electrically connected to the light-emitting element under control of the light-emission control signal, the second light-emission control circuit is configured to control the first voltage terminal to be electrically connected to the second terminal of the driving circuit under control of the light-emission control signal, and the driving circuit is configured to drive the light-emitting element to emit light.

4. The pixel circuit according to claim 3, wherein the data written-in circuit comprises a first transistor, the compensation control circuit comprises a second transistor, the energy storage circuit comprises a storage capacitor, and the driving circuit comprises a driving transistor;

a control electrode of the first transistor is electrically connected to the written-in control line, a first electrode of the first transistor is electrically connected to the data line, and a second electrode of the first transistor is electrically connected to the first terminal of the driving circuit;

a control electrode of the second transistor is electrically connected to the compensation control line, a first electrode of the second transistor is electrically connected to the control terminal of the driving circuit, and a second electrode of the second transistor is electrically connected to the second terminal of the driving circuit;

a first terminal of the storage capacitor is electrically connected to the control terminal of the driving circuit, and a second terminal of the storage capacitor is electrically connected to the first electrode of the light-emitting element;

a control electrode of the driving transistor is the control terminal of the driving circuit, a first electrode of the driving transistor is the first terminal of the driving circuit, and a second electrode of the driving transistor is the second terminal of the driving circuit.

5. The pixel circuit according to claim 1, wherein the second light-emission control circuit comprises a third transistor, and the first light-emission control circuit comprises a fourth transistor;

a control electrode of the third transistor is electrically connected to the light-emission control line, a first electrode of the third transistor is electrically connected to the first voltage terminal, and a second electrode of the third transistor is electrically connected to the second terminal of the driving circuit;

a control electrode of the fourth transistor is electrically connected to the light-emission control line, a first electrode of the fourth transistor is electrically connected to the first terminal of the driving circuit, and a second electrode of the fourth transistor is electrically connected to the first electrode of the light-emitting element.

6. The pixel circuit according to claim 3, wherein the first initialization circuit comprises a fifth transistor;

a control electrode of the fifth transistor is electrically connected to the reset control line, a first electrode of the fifth transistor is electrically connected to the first initial voltage terminal, and a second electrode of the fifth transistor is electrically connected to the control terminal of the driving circuit.

7. The pixel circuit according to claim 1, wherein the second initialization circuit comprises a sixth transistor;

a control electrode of the sixth transistor is electrically connected to the initial control line, a first electrode of the sixth transistor is electrically connected to the second initial voltage terminal, and a second electrode of the sixth transistor is electrically connected to the first electrode of the light-emitting element.

8. The pixel circuit according to claim 1, further comprising a third initialization circuit;

wherein the third initialization circuit is electrically connected to the reset control line and a third initial voltage terminal, the third initialization circuit is electrically connected to the first terminal of the driving circuit or the second terminal of the driving circuit, and the third initialization circuit is configured to write a third initial voltage from the third initial voltage terminal into the first terminal of the driving circuit or the second terminal of the driving circuit under control of the reset control signal from the reset control line.

9. The pixel circuit according to claim 8, wherein the third initialization circuit comprises a seventh transistor;

a control electrode of the seventh transistor is electrically connected to the reset control line, a first electrode of the seventh transistor is electrically connected to the third initial voltage terminal, and a second electrode of the seventh transistor is electrically connected to the first terminal of the driving circuit or the second terminal of the driving circuit.

10. The pixel circuit according to claim 8, wherein a transistor in the first light-emission control circuit and the second light-emission control circuit, a transistor in the data written-in circuit, a transistor in the compensation control circuit, a transistor in the driving circuit, a transistor in the first initialization circuit, a transistor in the second initialization circuit, and a transistor in the third initialization circuit are each an oxide thin film transistor.

11. A display device comprising the pixel circuit according to claim 1.

12. The display device according to claim 11, wherein the data written-in circuit comprises a first transistor, the compensation control circuit comprises a second transistor, the energy storage circuit comprises a storage capacitor, and the driving circuit comprises a driving transistor;

a control electrode of the first transistor is electrically connected to the written-in control line, a first electrode of the first transistor is electrically connected to the data line, and a second electrode of the first transistor is electrically connected to the first terminal of the driving circuit;

a control electrode of the second transistor is electrically connected to the compensation control line, a first electrode of the second transistor is electrically connected to the control terminal of the driving circuit, and a second electrode of the second transistor is electrically connected to the second terminal of the driving circuit;

a first terminal of the storage capacitor is electrically connected to the control terminal of the driving circuit, and a second terminal of the storage capacitor is electrically connected to the first electrode of the light-emitting element;

a control electrode of the driving transistor is the control terminal of the driving circuit, a first electrode of the driving transistor is the first terminal of the driving circuit, and a second electrode of the driving transistor is the second terminal of the driving circuit.

13. The display device according to claim 11, wherein the second light-emission control circuit comprises a third transistor, and the first light-emission control circuit comprises a fourth transistor;

a control electrode of the third transistor is electrically connected to the light-emission control line, a first electrode of the third transistor is electrically connected to the first voltage terminal, and a second electrode of the third transistor is electrically connected to the second terminal of the driving circuit;

a control electrode of the fourth transistor is electrically connected to the light-emission control line, a first electrode of the fourth transistor is electrically connected to the first terminal of the driving circuit, and a second electrode of the fourth transistor is electrically connected to the first electrode of the light-emitting element.

* * * * *